UNITED STATES PATENT OFFICE.

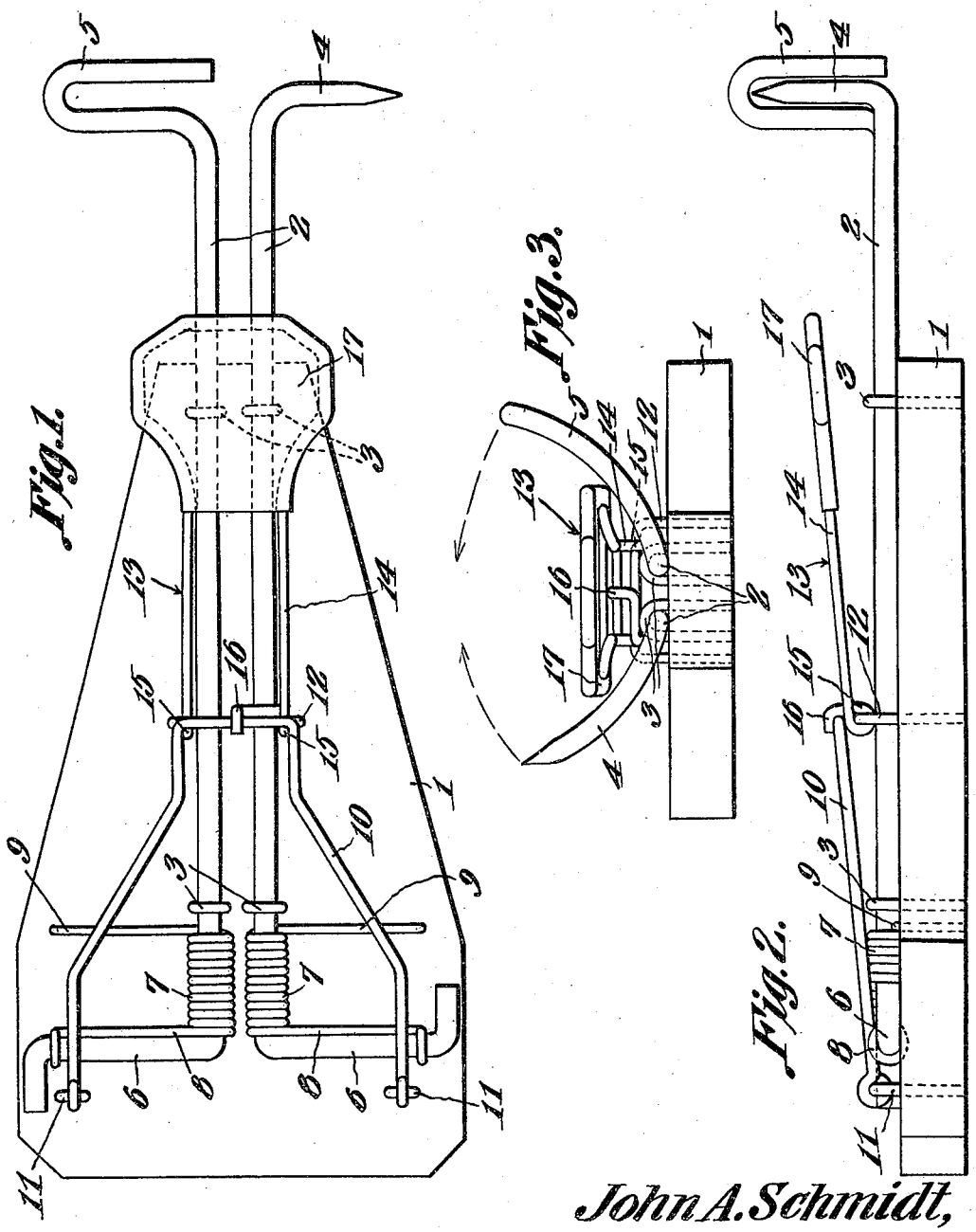

JOHN A. SCHMIDT, OF MARCUS, WASHINGTON, ASSIGNOR OF ONE-HALF TO FAYETTE W. SCHENCK, OF MARCUS, WASHINGTON.

TRAP.

1,146,106. Specification of Letters Patent. Patented July 13, 1915.

Application filed July 31, 1914. Serial No. 854,348.

*To all whom it may concern:*

Be it known that I, JOHN A. SCHMIDT, a citizen of the United States, residing at Marcus, in the county of Stevens and State of Washington, have invented a new and useful Trap, of which the following is a specification.

The present invention appertains to traps, and aims to provide a novel and improved trap for catching squirrels, gophers, rats, ground-hogs and other rodents or burrowing animals.

It is the object of this invention to provide a trap which is particularly adapted for insertion into the hole or burrow of a rodent, and which is operable to catch the burrowing animal in an effective manner.

The present invention contemplates the provision of a trap embodying a unique assemblage of parts, and which is improved generally in its construction, to enhance the utility of the trap, and to render the same comparatively simple, compact and inexpensive in construction, as well as convenient, practical and efficient in its use.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

The invention has been illustrated in the accompanying drawing, wherein:—

Figure 1 is a plan view of the trap in set condition. Fig. 2 is a side elevation thereof, and Fig. 3 is an end view of the trap, parts being broken away.

In carrying out the present invention, there is provided a base 1, which is preferably, although not necessarily, constructed of wood, and a pair of juxtaposed longitudinal rods or rock shafts 2 are journaled upon the median portion of the base 1, by means of staples 3 engaging over or straddling the rods 2 and driven into or engaging the base 1. The rods 2 project beyond one end of the base 1, and the protruding ends of the rods are formed into angularly-extending jaws 4 and 5, which are curved upwardly and which diverge away from each other when the trap is set, as illustrated in the drawing. The jaw 4 is in the form of a curved spur or prong, while the jaw 5 is in the form of a loop or U-shaped bend, whereby the jaw 5 is slotted to receive the spur or finger 4 which is pointed. The base 1 is preferably tapered toward the jaws 4 and 5, whereby the trap may be readily inserted into a hole or burrow with the jaws 4 and 5 innermost and with the opposite end of the base exposed. The other end portions of the rods or shafts 2 are bent angularly, as at 6, and are arranged to rest or lie upon the base 1, when the jaws 4 and 5 are swung apart or opened. The rods 2 are spring pressed to tend to swing the jaws 4 and 5 together, and to this end, coiled wire torsional springs 7 embrace or are disposed upon the rods 2 adjacent the angular end portions 6, those ends of the springs 7 adjacent the angular portions 6 having arms or radial extensions 8 having their ends looped around the angular portions 6, and the other ends of the springs 7 having radial arms or extensions 9, whose terminals are engaged downwardly into the base 1. Thus, the springs 7 tend to swing the arms or extensions 8 upwardly and toward each other, to correspondingly swing the angular end portions 6 of the rods 2, whereby the jaws 4 and 5 will be swung closed.

A detent 10 is provided for holding the jaws in open position, the detent 10 being bent from a wire or rod into approximate U-shape and having its terminals formed into eyes engaging staples 11 driven into the base 1 adjacent the angular end portions 6 of the rods 2. Thus, the detent 10 is pivoted to the base outside of the angular end portions 6, and when the angular end portions 6 are swung against the base 1, the detent 10 may be swung over the said end portions 6 and the sections or limbs of the detent 10 will swing upon the angular end portions 6 to retain them in depressed position and to hold the jaws 4 and 5 separated.

A large staple or yoke 12 is engaged to the base 1 and straddles the rods 2 between their ends, the free end or bend of the detent 10 being arranged to swing over the staple or yoke 12 when the detent is swung over the end portions 6 of the rods 2, as seen in Figs. 1 and 2. A trigger 13 is pivoted to the staple or yoke 12 and embodies a wire or rod 14 doubled and having its end portions formed with eyes 15 loosely embracing the staple or yoke 12 at the sides of the rods 2, and one terminal of the wire or rod 14 is extended inwardly and upwardly into a hook or finger 16 for engaging over the bend or free end of the detent 10. A sheet metal plate 17 is seated upon the free or bent portion or trigger 13, and has its edges bent downwardly under the bent portion of the trigger, whereby the plate 17 provides a tread for the animal or rodent. The plate or tread 17 is disposed adjacent the jaws 4 and 5, or in other words, the trigger 13 projects toward the said jaws. Thus, the detent 10 is arranged to swing over the rear ends of the rods 2, to be engaged by the trigger, and the trigger swings above the said rods to provide a compact and desirable arrangement of the parts.

To set the trap, the rear angular end portions 6 of the rods or shafts 2 are swung apart and downwardly against the base 1, and the detent 10 is then swung over the end portions 6 to thereby hold the jaws 4 and 5 open or separated. The trigger 17 is then raised so that its hook or finger 16 swings over the free end or bend of the detent 10, to hold the detent in depressed position, and whereby the trap will be set. The jaws and trigger may then be inserted into the hole or burrow and may be properly positioned for catching the animal desired, and it is preferable to so dispose the trap, that the animal is constrained to pass over or between the jaws 4 and 5 in approaching the trigger 13. Then, when the animal passes over the jaws 4 and 5 and steps upon the tread 17 of the trigger, the trigger will be depressed, and the hook 16 at the pivoted end of the trigger will be released from the detent, which will enable the end portions 6 of the rods 2 to swing upwardly under the influence of the springs 7 to cause the jaws to be quickly closed for embracing or clutching the animal tightly. When the end portions 6 are raised, the detent 10 will be thrown rearwardly, and the jaws 4 and 5 being of the peculiar formation indicated, will securely and firmly grip the animal. The pointed jaw 4 will also tend to enter the slotted jaw 5, to tend to pierce the animal to kill the same.

Having thus described the invention, what is claimed as new is:—

A trap comprising a base, a pair of rods journaled thereon, and having jaws at one end and angular portions at their other ends, a U-shaped detent having its terminals pivoted to the base adjacent the same angular portions, the detent being swingable over the said angular portions when the jaws are opened, the rods being spring pressed to close the jaws, and a trigger embodying a doubled wire and a tread plate secured upon the bent portion thereof, the terminals of the trigger being pivoted to the base and one terminal being formed into a hook engageable over the bend of the detent, when the detent is swung over the said angular portions, the trigger projecting toward the said jaws.

In testimony that I claim the foregoing as my own, I have hereto affixed my signature in the presence of two witnesses.

JOHN A. SCHMIDT.

Witnesses:
  FAYETTE W. SCHENCK,
  RUTH M. BARRINGER.

Copies of this patent may be obtained for five cents each, by addressing the "Commissioner of Patents, Washington, D. C."